Figure 1:
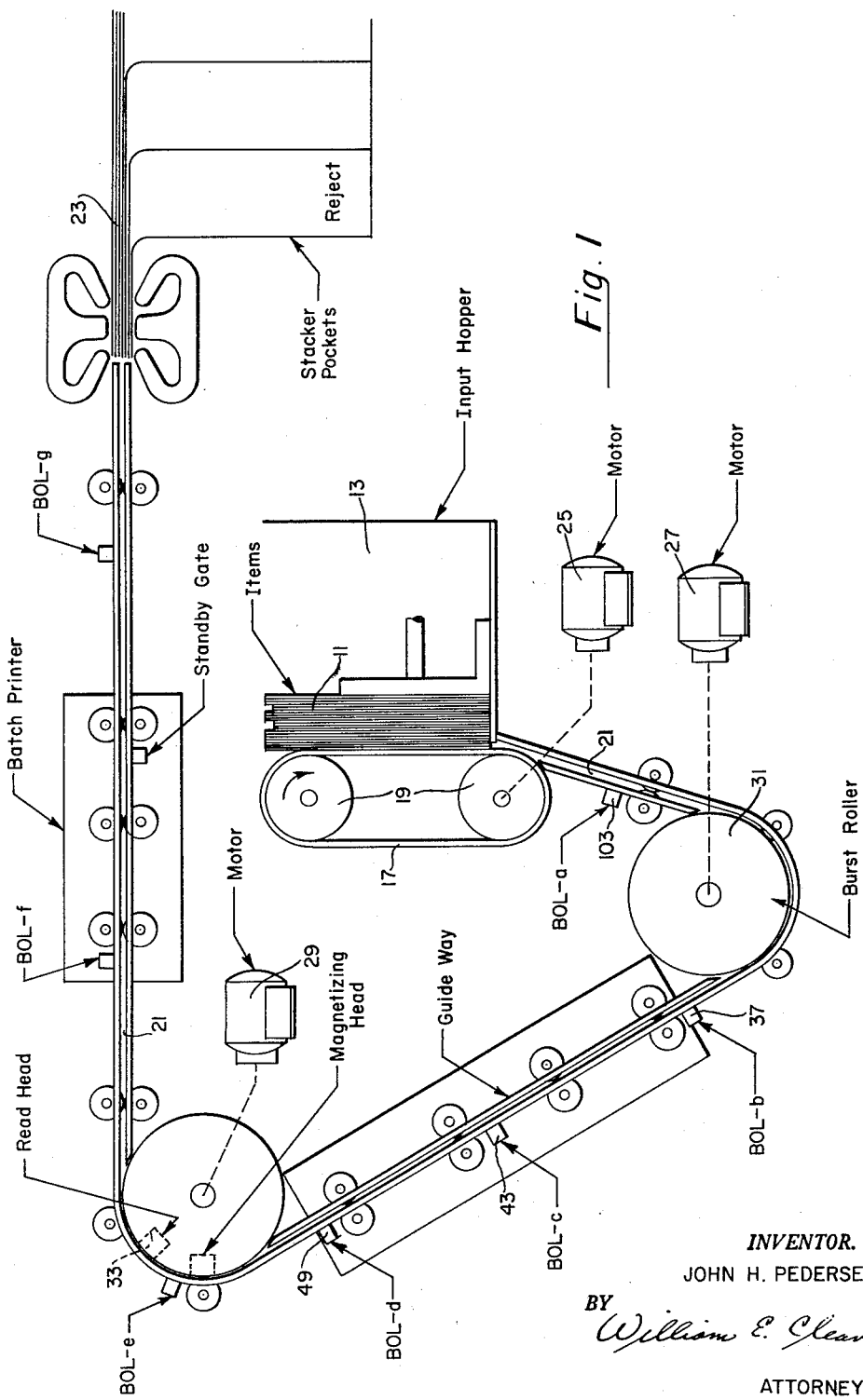

INVENTOR.
JOHN H. PEDERSEN
BY William E. Cleaver
ATTORNEY

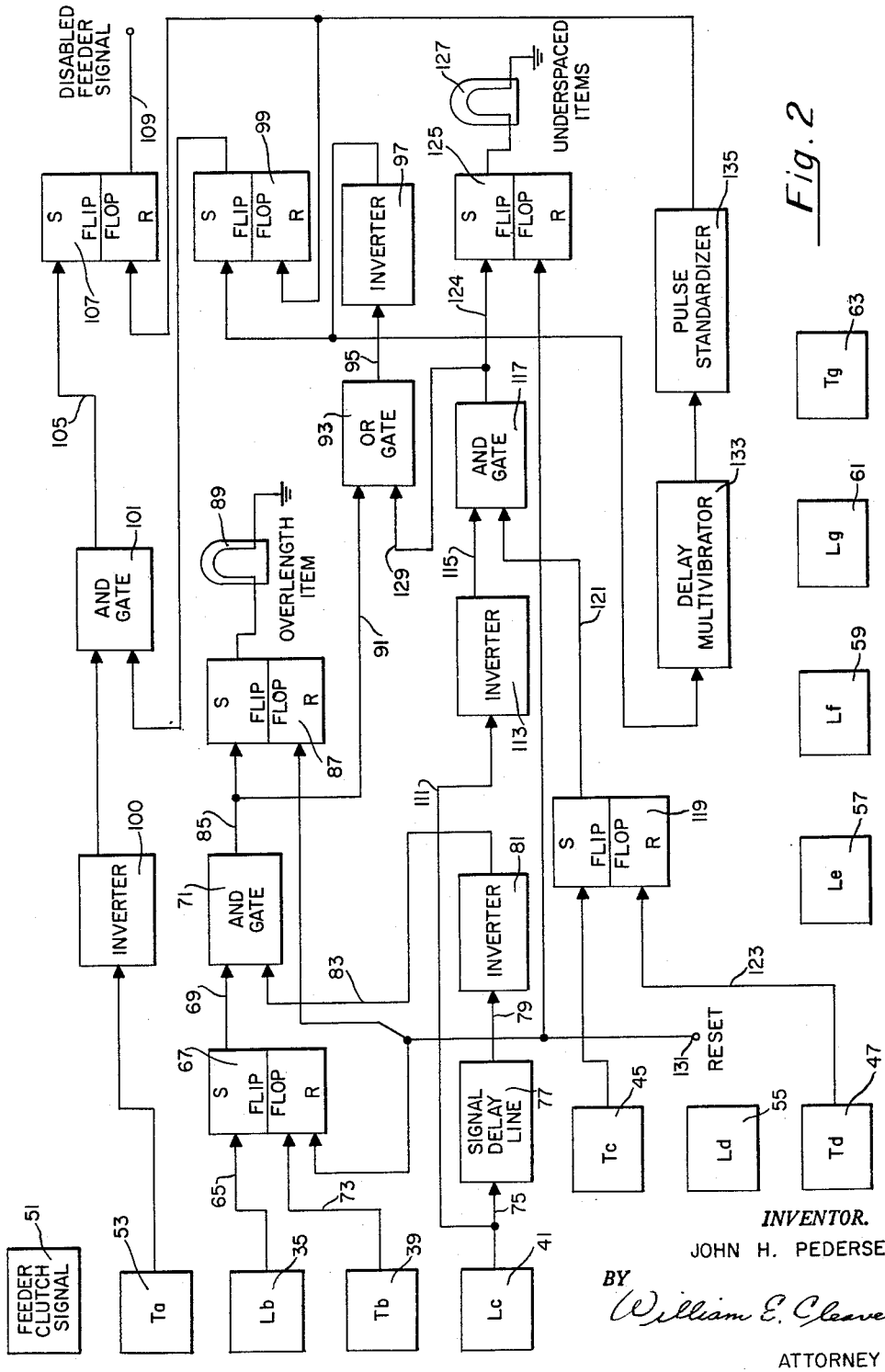

United States Patent Office 3,046,538
Patented July 24, 1962

3,046,538
DOCUMENT MONITORING SYSTEM
John H. Pedersen, Malvern, Pa., assignor to Burroughs Corporation, Detroit, Mich., a corporation of Michigan
Filed Dec. 24, 1959, Ser. No. 861,828
11 Claims. (Cl. 340—259)

This invention relates to automatic item transport systems, and more particularly to a monitoring arrangement for detecting the movement of items transported by such a system and for providing signals signifying whether or not the system is properly operating.

When work is performed on items in an automatic process, it is often necessary to transport the items along a path through many stations where the work is performed. At each of the stations the item is subjected to certain physical and/or analytical operations, and it is then moved on to the next station. For instance, when bank checks and deposit slips are fed through a bank check sorter device, these checks have pre-printed or punched information read from them (an analytical operation) at one station; have additional information transferred to them at a printing station (a physical operation); and are directed to a particular receiving pocket (another physical operation) at yet another station. Another example of an item transport arrangement is found in the manufacture of certain aeroplane motors where a rough casting is inserted in the system and is then automatically transported through a number of operating stations for grinding, milling, waxing, etc. The item which started as a rough casting emerges from the automatic manufacturing process as a finished cylinder.

In such item transport arrangements, especially if they are high speed systems, at least two basic monitoring operations are deemed necessary while other monitoring operations may be considered optional in order to insure that the movement of the items is being carried on properly and in order to prevent jams which result in damage to the items.

With regard to the "necessary" operations, first, the system should recognize when there has been a failure to feed an item into the system. Secondly, the system should recognize when the items are moving at a speed through the item transport path which is substantially different from the rated item speed of the system.

In the optional category it is often desirable to recognize whether or not an item is oversized, and in another instance it is desirable to know whether or not the items are following one another too closely and are therefore under-spaced with respect to one another.

It is an object of the present invention to provide an improved system for selectively monitoring items which are being transported.

It is a further object of the present invention to provide an item transport monitoring system which detects whether or not an item is overlength.

It is another object of the present invention to provide an item transport monitoring system which detects when a second item is following too closely behind a first item and the items are therefore under-spaced with respect to one another.

In accordance with a primary feature of the present invention numerous monitoring stations are discretely located along the path of item transport. At each monitoring station the leading edge and the trailing edge of an item can be detected in accordance respectively with the entrance and departure of the item, and appropriate signals can be produced therefor.

In accordance with another primary feature a first signal detecting means is connected to receive the leading edge signal and the trailing edge signal from a first station as well as a delayed leading edge signal from a subsequent second station. Said first signal detecting means responds to indicate that the item is greater than a predetermined length if the leading edge signal from said subsequent second station arrives prior in time to the trailing edge signal from said first station.

In accordance with another primary feature, a second signal detecting means is connected to receive from said second station a trailing edge signal of a first item and the leading edge signal from a subsequent second station and is further connected to receive the trailing edge signal of said first item which is generated in response to said first item's departure from a third station. Said second signal detecting means responds to indicate that said second item is following said first item too closely if the leading edge signal of said second item from said second station is received prior in time to said first item's trailing edge signal generated in said third station.

Figure 3A:
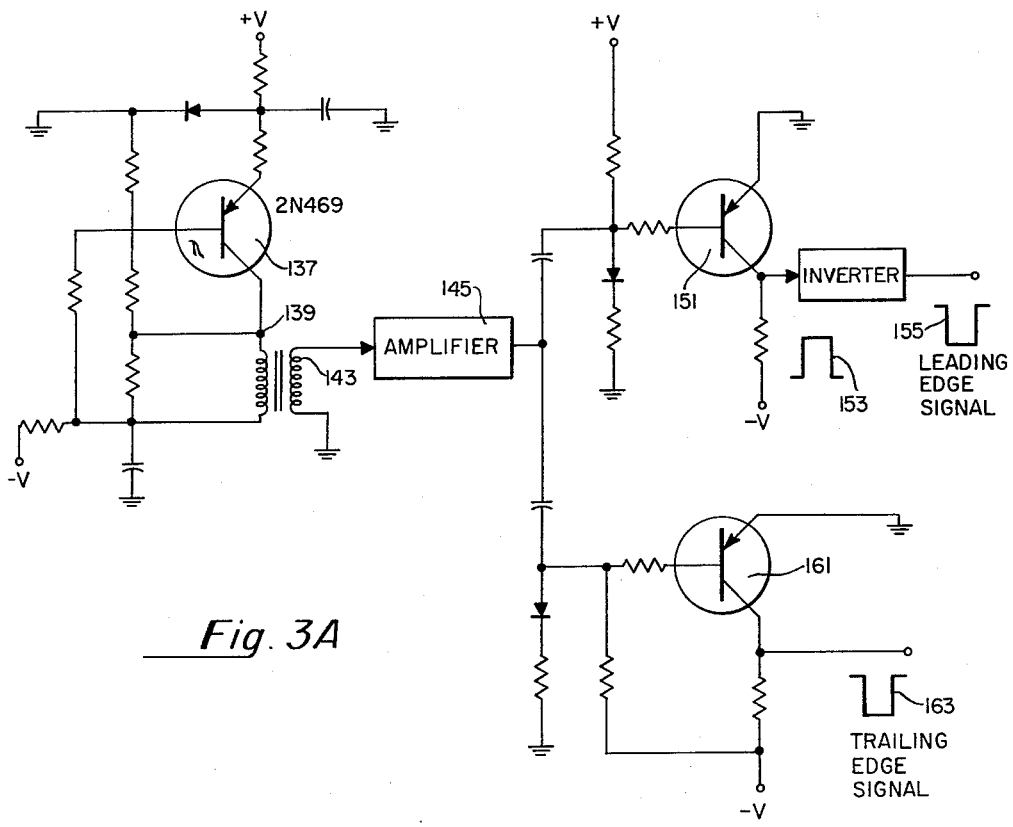
Figure 3B:
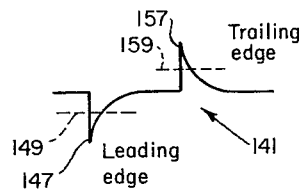

The foregoing and other objects and features of this invention will be best understood by reference to the following description of an embodiment of the invention taken in conjunction with the accompanying drawings, wherein FIG. 1 is a schematic diagram of an item transport path in a bank check sorter system;

FIG. 2 is a block diagram of the present invention in detail;

FIGS. 3A and 3B together constitute a schematic diagram of a beam-of-light circuit.

In FIG. 1 there is shown a schematic diagram of an item transport system used in a bank check sorting device. The invention will be described in connection with the item transport system of a bank check sorter, but it should be understood that the invention can be used effectively with any item transport arrangement such as employed in an automatic manufacturing process.

Consider first the over-all operation of the bank check sorter as shown in FIG. 1. The items, which are checks in our example, are held in a hopper 13 from whence they are fed into the system at the insert point 15 by a friction feed device. As the input belt 17, which is driven by the wheels 19 which in turn are driven (through a clutch not shown) by motor 25, moves in contact with the checks they are fed, or driven by friction. The novel feeding of checks in this system is described and claimed in the co-pending application entitled "Sheet Stack Advance Mechanism" by Misbin et al., Serial No. 772,552, filed November 7, 1958, and assigned to Burroughs Corporation.

The checks after leaving the hopper 13 are moved along the entire transport path 21 to the chute blades 23. In accordance with the information read from each check a chute blade is selected for each check to guide it to the proper stacker pocket. Only a small number of the stacker pockets are shown in FIG. 1. The checks are driven through the entire transport path by a series of drive rollers which are in turn driven by motors 25, 27 and 29. If the checks are detected as travelling improperly, for instance slower than they should be, the monitoring system generates a signal which is transmitted to disengage the clutch devices for motors 25, 27 and 29 in order to prevent driving additional items along the path. The system philosophy at this point is that by stopping any further movement of items when an irregular transport condition is detected, possible jam conditions which normally result from irregular item feeding, will be prevented before they actually happen. This portion of the monitoring system is described and claimed in the co-pending U.S. patent application entitled "Item Transport Monitoring System" by L. Tanguy, Jr. Serial No. 861,963, filed December 24, 1959, and assigned to Burroughs Corporation. When an overlength or underspaced condition is detected, the wheels 19 are disengaged from motor 25 and a brake means is applied to stop wheels 19.

If the impropriety detected is that a check appears to be overlength, or that two checks are travelling too closely together, then the belt wheels 19 are temporarily disengaged and the reject pocket chute blade is selected so that (1) no additional checks are fed and (2) the checks in the transport path are moved into the reject pocket. After a short period of time the belt wheels 19 are again automatically engaged and continues the normal operation of feeding checks into the system. The philosophy with regard to this last-described operation is that an apparently overlength check might actually be two or more overlapping checks and they should be cleared out of the transport path into the reject pocket for examination by the operator of the system. Similarly, two checks travelling too closely together should be cleared and examined. It would be a simple matter to stop the machine and check the items as they are found in the transport path, but in the particular system under consideration it has been determined that a shut down procedure rather than a temporary interruption unnecessarily slows down the over-all operation.

In the bank check sorting system we are herein considering, the items leaving the hopper 13 are travelling at a speed of 150 inches per second. Their speed is increased to 400 inches per second when the items come in contact with the burst roller 31, and continue to travel at 400 inches per second throughout the system. Further, in the bank check sorting system under consideration here certain information found on the checks is read at the read head station 33. The information read at 33 is processed and eventually provides for the selection of the proper one of the chute blade paths 23. The operation of the reading system and the selection of the chute blades are respectively described and claimed in co-pending U.S. patent applications entitled "Voltage Comparison Circuit" by Shaeffer et al., Serial No. 789,983, filed January 29, 1959, and "Item Handling Apparatus" by Hanstein et al., Serial No. 837,004, filed August 31, 1959, now abandoned, (which was filed as a continuation application, Serial No. 116,914, filed May 31, 1961) both of which are assigned to Burroughs Corporation.

For a better understanding of the present invention consider in a general way the role played by the signals generated from three consecutive beam-of-light stations. In order to detect whether or not a check is overlength, a standard length against which the check can be measured is made available. By physically locating the first and second stations from each other at approximately the standard length, it follows that if the leading edge of a check is recognized at the first station then the check at this particular time is fitting exactly between the two stations and threefore has a standard length by definition, since it is equal to the distance between the first and second stations.

However it may not be possible to locate the first and second stations at the exact standard length for various design reasons, and further, the acceptable length may vary from time to time depending on the whims of the user. In the present system the second station has a signal delay means which has the effect of relocating the second station without physically disturbing its position.

In the present system when a check enters the first station its entry is noted electronically (breaking the beam of light), and temporarily recorded. The leading edge of the check then travels to the second station and similarly generates a leading edge signal from the second station. At this time the trailing edge of the check may not have departed from the first station (assuming a long check), so this second station leading edge signal is delayed. The check moves on and subsequently generates a trailing edge signal from the first station. The delayed leading edge signal and the undelayed trailing edge signal are transmitted to a signal comparing means whereat they are compared in time. If the check is overlength it will generate a leading edge signal at the second station which even after it has been delayed will be transmitted to the comparing means before the trailing edge of the check has actually moved past the first station to cause a trailing edge signal to be generated. Hence, if the delayed leading edge signal is received first in time the check is deemed to be overlength. If, on the other hand, the check is within the tolerable length, or standard length, the trailing edge of the check will move past the first station thereby generating a trailing edge signal which is transmitted to the signal comparison means prior in time to the delayed leading edge signal from the second station. As suggested before, the delaying of the leading edge signal is the equivalent of increasing the physical distance between the first and second stations since it gives the check additional time to travel before a trailing edge signal must be generated. From the above description it should be clear that the system effects a comparison in time between a delayed leading edge signal from the second station and an undelayed trailing edge signal from the first station in order to measure the length of a check and compare this measured length with a tolerable standard length.

As the check moves on, the signals from the second station and the third station are compared to determine if a second check is following a first check too closely. Assume there is a standard minimum distance that the checks should be kept apart to insure a proper operation. If the distance between the trailing edge of one check and the leading edge of a following check is measured and compared with the minimum distance then it can be determined whether or not the checks are the proper distance apart. This is accomplished by locating the third station from the second station by a distance which approximates said standard minimum distance. Further, a second signal comparison means is provided to compare the time a check departs from the third station and the time that a subsequent check arrives in the second station. Considering that the distance between the second and third stations is the minimum distance, it follows that a check should depart from the third station before a subsequent check arrives at the second station or the checks can be considered travelling too closely together. This second signal comparison means compares the trailing edge signal from the third station with the leading edge signal generated by a subsequent item from the second station and if the leading edge signal arrives prior in time it is concluded that the checks are too closely spaced with respect to each other.

In the following discussion reference will be made to AND gates and OR gates. It should be understood that to fully condition an AND gate in a preferred embodiment described herein, the AND gate must receive, simultaneously on each input line, a positive input signal and in response thereto and AND gate will provide a negative output signal. Further, if said AND gate is not fully conditioned the output signal provided therefrom will be a positive output signal. It should also be understood that an OR gate described herein need only receive a negative input signal on one input line and will provide a positive output signal in response thereto. If said OR gate does not have any negative input signals applied thereto the output signal therefrom will be negative. In addition there is included in the description to follow references to bistable multivibrators or flip-flops. It should be understood that a flip-flop will be set or reset in response to a negative input signal. When a flip-flop has been set it will provide a positive voltage output signal from the terminal representing the set condition and simultaneously provide a negative voltage output signal from the terminal representing the reset condition. Similarly, when a flip-flop has been reset its set terminal will provide a negative voltage output signal while its reset terminal will provide a positive voltage output signal.

The detailed description to follow will be considered according to two important functions of the system. The first important function of the present invention is the determination of an over-length item. As stated earlier, the present invention is to be described in connection with a bank check sorter. In banking operations, checks which are handled by automation have varying lengths. There is, however, at any one calendar date a maximum length for such checks, although this maximum length may change by agreement among bankers. In the present system if a check is of no greater length than this maximum length it is allowed to pass through the system. If, however, the system detects a check which is longer than the maximum length an alarm signal is generated. As suggested earlier, the rationale for providing this alarm signal is that a check which has been detected as being over-length may in point of fact be two or more checks physically stuck together passing through the machine, or on the other hand may be some document other than a check. Two or more checks physically sticking together and being transported through the machine may give rise to mis-sorting of the items or to jamming of the checks and, of course, item jams are to be prevented. Hence when this possible source of trouble is detected an alarm signal is provided.

Consider now FIG. 2 in conjunction with FIG. 1. FIG. 2 is a block diagram of the system. In FIG. 2 there is shown a signal source 35 which provides a leading edge signal in response to the entry of an item into the BOL–b station 37 in FIG. 1. Also shown in FIG. 2 is a signal source 39 which provides a trailing edge signal as an item departs from the BOL–b station 37. The signal source 41 provides the leading edge signals in BOL–c station 43 of FIG. 1 while the signal source 45 provides the trailing edge signals at this BOL–c station. The other signal source 47 with which we are primarily concerned provides the trailing edge signals at the BOL–d station 49 in FIG. 1.

The remainder of the signal sources such as the feeder clutch signal source 51, the trailing edge signal source 53, the leading edge signal source 55, 57, 59 and 61, and the trailing edge signal source 63 all play an important role in the over-all item transport monitoring system. Their function is described and claimed in the co-pending application entitled "Monitoring System" by Lewis L. Tanguy, Jr., mentioned above.

When a check has entered the BOL–b station 37 in FIG. 1 there is a leading edge signal (hereinafter referred to as an Lb signal) provided from source 35 of FIG. 2 which is transmitted on line 65 to set the flip-flop 67. The output from the flip-flop 67, when in its set condition, is transmitted on line 69 to partially condition the AND gate 71. When the check which has given rise to the Lb signal from source 35 departs from the BOL–b station 37 it will provide a trailing edge signal from source 39 (hereinafter referred to as a Tb signal) which is transmitted on line 73 to reset the flip-flop 67. As this last-mentioned check travels on and enters the BOL–c station 43 in FIG. 1 it causes a leading edge signal (Lc signal) to be generated and transmitted from source 41 in FIG. 2. This Lc signal from source 41 is transmitted on line 75 to the signal delay line 77. The Lc signal is delayed at the signal delay line 77 for a pre-determined time and then transmitted therefrom on line 79 to be inverted at inverter 81 and subsequently transmitted on line 83 to fully condition (in conjunction with the output of flip-flop 67) the AND gate 71.

It becomes apparent from the above description that if flip-flop 67 is in its set condition (thereby partially conditioning the AND gate 71 with a positive signal) at the time that the delayed Lc signal is transmitted on line 83, the AND gate 71 will be fully conditioned to provide a negative output signal on line 85.

The output signal from AND gate 71 is transmitted along one path to set flip-flop 87 thereby causing the lamp 89 to be illuminated. The illumination of lamp 89 is a visible indication that the item which has just been transported into the area monitored by stations 37 and 43 is an over-length item. The negative output signal from AND gate 71 is transmitted also on line 91 to condition OR gate 93 which in response provides a positive output signal on line 95. The positive output signal on line 95 is inverted at the inverter 97 and transmitted therefrom to set flip-flop 99. The positive output signal from the set condition of flip-flop 99 partially conditions AND gate 101.

When a subsequent check is transported from the BOL–a station 103 in FIG. 1 the Ta pulse from source 53 (generated in response to the trailing edge of the subsequent check) will be inverted at inverter 100 to become a positive signal. This positive Ta signal in conjunction with the signal from flip-flop 99 will fully condition the AND gate 101 to provide a negative output signal on line 105. The negative output signal on line 105 sets the flip-flop 107. When the flip-flop 107 is in its set condition there is provided from the reset terminal a negative signal, the "disabled feeder signal," which appears on line 109. As described in the co-pending application of Lewis L. Tanguy, Jr., mentioned above, this disabled feeder signal temporarily terminates the recirculation of a Ta signal, and also causes belt wheels 19 to be stopped temporarily, interrupting the flow of items from the input hopper 13.

In the description above we considered that the check being transported along the path 21 and in the area monitored by stations 37 and 43 was over-length in order to consider how the AND gate 71 becomes fully conditioned. As was suggested earlier, the logic of the system in monitoring the movement and detecting an over-length item is as follows: if the item is of such a length that its trailing edge has not departed from station 37 before its leading edge has caused a signal at station 43, the item is considered too long. In other words, the distance between station 37 and station 43 substantially represents the tolerable length that an item might have. It will be noted in the circuitry that the leading edge signal from source 41 is delayed at the signal delay line 77. This means that the item can be actually longer than the distance between station 37 and station 43 of FIG. 1. The addition of the signal delay line 77 permits the machine to have a certain amount of flexibility. For instance, if it is agreed that the tolerable length of the items (checks) is to be increased, the signal delay may be increased. The increase in the delay time allows the Tb pulse to arrive at flip-flop 67 later and still prevent an over-length signal. In essence, an increased signal delay would permit an item which is spread between the stations 37 and 43 to be longer than would have theretofore been tolerated before an "over-length" signal appeared at the lamp 89.

As suggested above, the description of the over-all system is to be considered in accordance with two important functions, the first of which has just been described. The second important function is that of detecting whether or not the space between two items (checks) is shorter than a predetermined length. When the check sorter is operating properly there is a certain minimum distance existing between any one check and a following check. If the distance between a second check following a first check in transport becomes less than the minimum, the situation is recognized and a signal is provided indicating the items are under-spaced with regard to one another. The rationale for the second function alarm signal is that such under-spacing between items is an irregularity which might lead to jamming of items.

Consider now the second function of the monitoring operation. The Lc signal generated when the leading edge entered station 43 is transmitted on line 111 to inverter 113 to provide a positive signal therefrom on line 115 to partially condition the AND gate 117. The Lc signal from the first item is ineffective as will be explained later and it is the Lc signal from a second item which provides a comparison. When the item leaves the station 43 a Tc signal from source 45 sets the flip-flop 119. The Tc signal follows in time the Lc signal, which was initiated by the same item, by the period that it takes the check to get through station 43. Therefore, the positive signal being transmitted from the set condition of flip-flop 119 on line 121 cannot fully condition the AND gate 117 since (because of the time lag), there will not be a positive signal on line 115 at Tc time.

If flip-flop 119 is in its set condition when an Lc signal generated from a subsequent check then the AND gate 117 will be fully conditioned, and as will be explained below, the output signal from AND gate 117 will initiate a circuit operation to provide an alarm signal indicating under-spaced items.

In order to understand the generation and prevention of the "under-spaced items" alarm signal, continue with the examination of the check travelling from station 43. As the check which initiated the last-mentioned Tc pulse moves on through station 49 there is a Td pulse provided from source 47. The Td pulse from source 47 is transmitted on line 123 to reset the flip-flop 119. If the flip-flop 119 is transferred to its reset condition prior in time to the generation of an Lc signal from a subsequent check the AND gate 117 will not be fully conditioned and there will not be an alarm signal.

The circuitry just described in connection with the second function of the monitoring system provides that if a check whose departure from station 43 has been recorded (setting flip-flop 119) does not arrive at station 49 and erase the recorded information (resetting flip-flop 119) before a second check arrives at station 43, then the distance between the two checks will be less than a tolerable minimum distance and an alarm signal will be generated. It becomes apparent that the minimum distance in the arrangement shown is the distance between stations 43 and 49, but it should be understood that by the addition of a signal delay means in the Lc circuit the minimum distance could be changed or made variable.

The generation of the "under-spaced items" alarm signal commences with the output from a fully conditioned AND gate 117. The output from AND gate 117 is transmitted on line 124 to set flip-flop 125. The output from the set condition of flip-flop 125 will cause the "under-spaced items" indicator lamp 127 to become illuminated giving a visual indication that under-spaced items have been detected. The output from AND gate 117 is also transmitted along line 129 to condition the OR gate 193. The output from OR gate 193 has been previously described, and in accordance with that description an output from AND gate 117 will result in a disabled feeder signal being transmitted on line 109.

Further included in the circuitry of FIG. 2 are two reset circuits. The first is a reset circuit which provides at terminal 131 a signal to reset flip-flops 67, 87 and 125 when the machine is started up.

The second reset circuit for flip-flops 99 and 107 includes a delay multivibrator 133 and a pulse standardizer 135. When there is an output from the inverter 97 to set flip-flop 99 this output signal is delayed for a predetermined period at delay multivibrator 133 and then transmitted to pulse standardizer 135. The signal from pulse standardizer 135 is transmitted to reset flip-flops 99 and 109. The reset circuit just described effects an operation which is unique to the check sorter device. The negative "disabled feeder" signal on line 109 temporarily discontinues a recirculation of a Ta signal and temporarily interrupts the flow of the item from 13 in the system described in the U.S. patent application of Lewis L. Tanguy, Jr., mentioned above. After the delay period the flip-flops 99 and 107 are reset and the sorter device continues its normal operation. In the sorter system there is provision to stop feeding more items and send all items in transport to the reject pocket during this delay time since, because of the irregularities detected, the items warrant inspection by the operator and can be easily picked out from the reject pocket.

In FIGS. 3A and 3B there is shown a schematic of a beam-of-light circuit. The photosensitive transistor 137 responds to light striking its base element. Obviously the transistor can be replaced by some other form of photosensitive device. When a leading edge of a check crosses the beam of light the transistor 137 conducts less and the point 139 experiences a negative voltage shift; while when the check has travelled through the station and the beam of light again impinges on transistor 137 causing it to conduct more, the point 139 experiences a positive voltage shift. Waveform 141 shows the leading and trailing edge voltage shifts as they appear on the secondary winding 143 of the transformer. These two signals are amplified at the amplifier 145.

Consider the leading edge voltage shift 147 of waveform 141. If this signal becomes more negative than the level 149 the transistor 151 goes to saturation providing an amplified leading edge signal 153 which is inverted to appear as an amplified leading edge signal 155. If the trailing edge voltage shift 157 becomes more positive than level 159 the transistor 161 becomes cutoff to provide the amplified trailing edge signal 163.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A monitoring system for use with items in transport along an item transport path comprising, first monitoring signal source means located at a first station along said item transport path to provide a first station leading edge monitoring signal when said item is transported into said first station and to provide a first station trailing edge monitoring signal when said item is transported from said first station, second monitoring signal source means located at a second station along said item transport path to provide a second station leading edge monitoring signal when said item is transported into said second station, said second monitoring signal source means adapted to delay said second station leading edge monitoring signal, signal detecting means connected to receive said three monitoring signals and to be responsive to indicate an over-length item if said second station leading edge monitoring signal is received prior in time to said first station trailing edge monitoring signal.

2. A monitoring system according to claim 1 which further includes a signal delay means connected between said signal detecting means and said second station to receive said second station leading edge monitoring signal and delay it for a predetermined time before transmitting said second station leading edge monitoring signal to said detecting means.

3. A monitoring system for use with items in transport along an item transport path comprising first monitor signal source means including a single sensing element located at a first station along said item transport path and adapted to produce both a first station trailing edge monitoring signal when a first item is transported from said first station and to subsequently provide a first station leading edge monitoring signal when a second item enters a said first station, second monitoring signal source means located at a second station along said item transport path to produce a second station trailing edge monitoring signal when said first item is transported from said second station, signal detecting means connected to receive said monitoring signals to be responsive if said first station leading edge signal is received prior in time to said second station trailing edge monitoring signal.

4. A monitoring system for use with items in transport along an item transport path comprising first monitoring signal source means located at a first station along said item transport path to provide a first station leading edge monitoring signal when an item is transported into said first station and to provide a first station trailing edge monitoring signal when an item is transported from said first station, second monitoring signal source means located at a second station along said item transport path to provide a second station trailing edge signal when an item is transported from said second station and to provide a second station leading edge monitoring signal when an item is transported into said second station, third monitoring signal source means located at a third station along said item transport path to provide a third station trailing edge monitoring signal when an item has been transported from said third station, first signal detecting means connected to receive both said first station leading edge and trailing edge monitoring signals and to further receive said second station leading edge monitoring signal, second signal detecting means connected to receive both of said second station leading edge and trailing edge monitoring signals and to further receive said third station trailing edge monitoring signal, said first detecting means responsive to indicate that an item exceeds a predetermined length if said first detecting means receives said second station leading edge monitoring signal prior in time to receiving said first station trailing edge monitoring signal, and said second detecting means responsive to indicate that the space between a first and second item being simultaneously transported is shorter than a predetermined length if said second station leading edge monitoring signal generated by the presence of said second item is received prior in time to said third station trailing edge monitoring signal generated by a leading first item.

5. A monitoring system for use with items in transport along an item transport path comprising first monitoring signal source means located at a first station along said item transport path to provide a first station leading edge monitoring signal when said item is transported into said first station and to provide a first station trailing edge monitoring signal when said item is transported from said first station, second monitoring signal source means located at a second station along said item transport path to provide a second station leading edge monitoring signal when said item is transported into said second station, said second monitoring signal source means adapted to delay said second station leading edge monitoring signal, signal detecting means connected to receive said three monitoring signals, said signal detecting means including signal inhibiting means which will pass said second station leading edge monitoring signal if it should arrive prior in time to said first station trailing edge monitoring signal, signal indicating means connected to said inhibiting means to provide an indicative signal if said second station leading edge monitoring signal is passed through said inhibiting means.

6. A monitoring system according to claim 5 wherein said inhibiting means includes a bistable device having a first and second state, said bistable device connected to be transferred to its first state in response to said first station leading edge monitoring signal and transferred to said second state in response to said first station trailing edge monitoring signal, and wherein said inhibiting means further includes a coincidence device having one input connected to receive the output signal of said first state of said bistable device and another input connected to receive said second station leading edge monitoring signal.

7. A monitoring system according to claim 5 wherein said indicating means includes signal storing means to temporarily store a signal which has been passed through said inhibiting means.

8. A monitoring system for use with items in transport along an item transport path comprising first monitoring signal source means including a single sensing element located at a first station along said item transport path and adapted to produce both a first station trailing edge monitoring signal when a first item is transported from said first station and to subsequently provide a first station leading edge monitoring signal when a second item enters said first station, second monitoring signal source means located at a second station along said item transport path to produce a second station trailing edge monitoring signal when said first item is transported from said second station, signal inhibiting means connected to receive said three monitoring signals, said inhibiting means passing said first station leading edge monitoring signal if said second station trailing edge monitoring signal is received second in time, signal indicating means to provide an indicative signal if said first station leading edge monitoring signal is passed through said inhibiting means.

9. A monitoring system according to claim 8 wherein said inhibiting means includes a bistable device having a first and second state, said bistable device connected to be transferred to its first state in response to said first station trailing edge monitoring signal, and wherein said inhibiting means further includes a coincidence device having one input connected to receive the output signal of said first state of said bistable device and another input connected to receive said first station leading edge monitoring signal.

10. A monitoring system for use with items in transport along an item transport path comprising first monitoring signal source means located at a first station along said item transport path to provide a first station leading edge monitoring signal when an item is transported into said first station and to provide a first station trailing edge monitoring signal when an item is transported from said first station, second monitoring signal source means located at a second station along said item transport path to provide a second station trailing edge signal when an item is transported from said second station and to provide a second station leading edge monitoring signal when an item is transported into said second station, third monitoring signal source means located at a third station along said item transport path to provide a third station trailing edge monitoring signal when an item has been transported from said third station, first signal inhibiting means connected to receive both said first station leading edge and trailing edge monitoring signals and to further receive said second station leading edge monitor signal, second signal inhibiting means connected to receive both of said second station leading edge and trailing edge monitoring signals and to further receive said third station trailing edge monitoring signal, said first signal inhibiting means to pass said second station leading edge monitoring signal if it should arrive prior in time to said first station trailing edge monitoring signal, said second signal inhibiting means to pass said second station leading edge monitoring signal which has been generated in response to a second item if it should arrive prior in time to said third station trailing edge monitoring signal which has been generated in response to a first item, signal detecting means connected to said first and second signal inhibiting means to detect if a second station leading edge monitoring signal has been passed therethrough and to provide in response thereto a disabling signal for use with said item transport means.

11. A monitoring system according to claim 10 wherein said detecting means includes a temporary storage means to temporarily store a second station leading edge monitoring signal which has been detected, and which further includes signal delay means connected to the input of said temporary signal storage means to receive and delay an input signal, and circuitry means connected to receive the output of said signal delay means to transmit this delayed signal to said temporary storage means thereby erasing the temporarily stored second station leading edge monitoring signal.

References Cited in the file of this patent

UNITED STATES PATENTS

| | | |
|---|---|---|
| 2,653,309 | Hausz | Sept. 22, 1953 |
| 2,824,360 | Giboney | Feb. 25, 1958 |
| 2,916,633 | Stone et al. | Dec. 8, 1959 |
| 2,982,404 | Harmon | May 2, 1961 |

FOREIGN PATENTS

| | | |
|---|---|---|
| 795,480 | Great Britain | May 21, 1958 |